Dec. 8, 1936.    K. L. McHENRY    2,063,820
METHOD OF RECORDING SEISMIC WAVES
Filed Jan. 30, 1934    2 Sheets-Sheet 1

INVENTOR.
KARMON LORANE McHENRY
BY
ATTORNEYS.

UNITED STATES PATENT OFFICE 2,063,820

METHOD OF RECORDING SEISMIC WAVES

Karmon Lorane McHenry, Dallas, Tex., assignor, by direct and mesne assignments, of one-third to C and G Oil Company, Inc., and one-third to Wanete Oil Company, both of Dallas, Tex.

Application January 30, 1934, Serial No. 708,961

3 Claims. (Cl. 177—352)

The invention relates to a method for ascertaining the presence, depth, shape, and disposition of subsurface strata and other geologic structures in general.

With similar general objects in view, considerable research of this nature has already been carried out using known principles of seismology. Several seismic methods have been employed with substantial success during recent years in commercial exploration work, particularly in the region bordering the Gulf Coast.

Methods commonly used depend upon the fact that elastic waves in the earth travel through different materials at different rates of speed. Customary modes of procedure will necessarily be referred to hereinafter in connection with the detail description. This invention involves similar fundamental principles, but in addition thereto, makes use of the fact that when an artificially created elastic wave passes downwardly through the earth and encounters a medium of a substantially different velocity value, a certain portion of the energy of the wave will be reflected and returned to the surface of the earth.

Previous attempts to employ what may be called reflected waves have been heretofore unsuccessful because of the practical difficulty in recording the time of transmission of such waves. The indirect or reflected waves become so intermingled with what are herein termed direct waves, that is, waves traveling directly without reflection, that it has not been possible to distinguish the direct and the indirect waves on a wave record made by a suitable seismograph.

It is the general object of this invention to provide a method by which a reflected wave is more clearly recorded on a seismogram, and by which other waves are diminished in volume and amplitude to a desired degree while the reflected waves retain their normal characteristics, making it thereby possible to measure with practical certainty the time required for an artificially created seismic wave to travel from the surface of the earth down to a reflecting discontinuity and back to the surface, from which data the distance to the reflecting discontinuity may be computed.

On account of the nature of this invention, the specific objects and advantages thereof, may be more readily understood if considered in view of the following discussions, and the several diagrams on the drawings.

In order that the present invention may be more readily understood and appreciated, it is desirable to refer briefly to the prior art.

As previously mentioned, customary methods in use at present rely upon the fact that elastic waves in the earth travel through different materials at different rates of speed. For example, the velocity of a wave in a hard rock is much greater than the velocity of a like wave passing through loose, unconsolidated sediments. According to the known practice, if a determination is made of the time required for artificially created elastic waves to travel from a center of disturbance, such as a blast of dynamite or other explosive, to a recording seismograph located some distance away, it is a simple matter to say whether or not a hard bedrock exists above a certain depth in the intervening area.

This invention described a method for ascertaining the time required for an artificially created seismic wave to pass downwardly to the upper surface of a substratum of different density and back to the surface of the earth. The method is based on the fact that whenever an earth wave passes from one medium to another it is partially reflected, provided that there is a difference in the density of the media.

The problem would be simple if the reflected wave could be easily recognized on the seismograph record, because, knowing the time interval between the instant of the blast and the return of the reflected wave to the surface of the earth, and the average velocity of the elastic waves in such sediments, the depth of the reflecting surface may be computed.

However, it is known to those skilled in the art that the difficulty lies in the fact that the reflected wave is obscured by the direct waves, because the energy traveling direct from the blast to the seismograph does not arrive as a single impulse, but continues for several seconds, thereby rendering the direct and indirect waves indistinguishable.

It will be understood, of course, that seismograms made for this purpose contain a series of equally spread time-marks, placed thereon by mechanical means incorporated in a recording instrument described hereinafter.

Now it is the aim of this invention to substantially diminish the amplitude and effects of the direct waves as recorded on the seismogram and at the same time to clarify and improve the registration of the indirect waves by preserving both their characteristics and amplitude.

The reflected waves are quite similar to the direct waves, but they may be expected to have much less amplitude and energy at the seismograph for the reason that they have traveled a greater distance and because only a portion of the energy reaching the surface of the substratum is reflected therefrom. Both of these features, i. e., the similarity of the waves and the weak energy of the reflected waves, combine to increase the difficulty of recognizing the reflected wave on the seismogram.

The combination of instruments referred to can be easily accomplished by the use of several electrical seismometers, a few of which will now be described.

The Galitzien seismometer is a moving coil type, and is so constructed that, as the instrument responds to the motion of the earth, a coil in the instrument is made to move in a magnetic field. Consequently, an electric current is generated in the coil and is conducted through a cable to a galvanometer which registers photographically to produce a seismogram. In this manner an accurate record is obtained because the current induced in the coil corresponds in intensity and direction to the motion of the earth.

Another type of electrical seismometer suggested for this work employs a carbon button in place of the moving coil. Pressure on the carbon button is made to vary in response to the motion of the earth, and since this changes the resistance of the carbon button, the current flowing in the circuit, when a constant E. M. F. is provided, must vary. A galvanometer in the circuit records the current changes as in the case of the Galitzien seismometer.

A third type of seismometer employs a condenser in place of the moving coil or carbon button. The earth motion causes the distance between the plates of the condenser to change, and this changes the characteristics of a radio-frequency circuit sufficiently to operate a galvanometer or oscillograph. Amplification by means of vacuum tubes may be accomplished with any of these electrical instruments.

As each of the electrical seismometers just described as the unit which produces or varies the current, is separate from the recording apparatus, there is no difficulty in employing several of these instruments for simultaneous recording, provided that they are alike.

Bearing the foregoing in mind, it is desired to describe the drawings presented and their relation to the invention.

Figure 1:
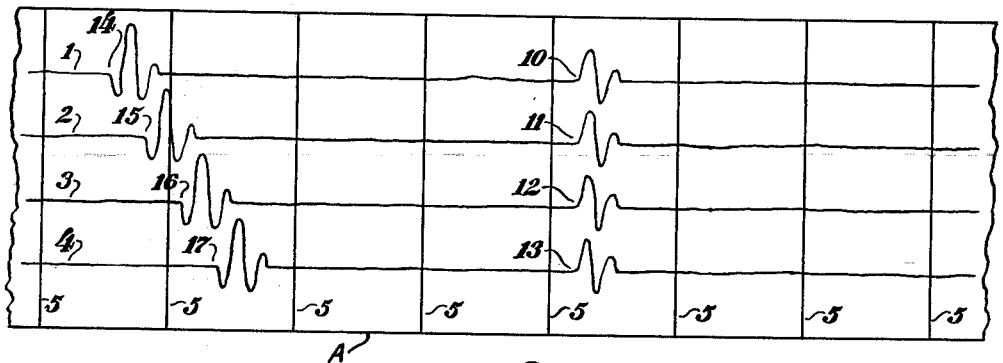
Figure 1 is a diagram of a photographic strip on which the electrical variations of four seismometers (as in Figure 2) have been recorded by a multiple string galvanometer.
Figure 2:
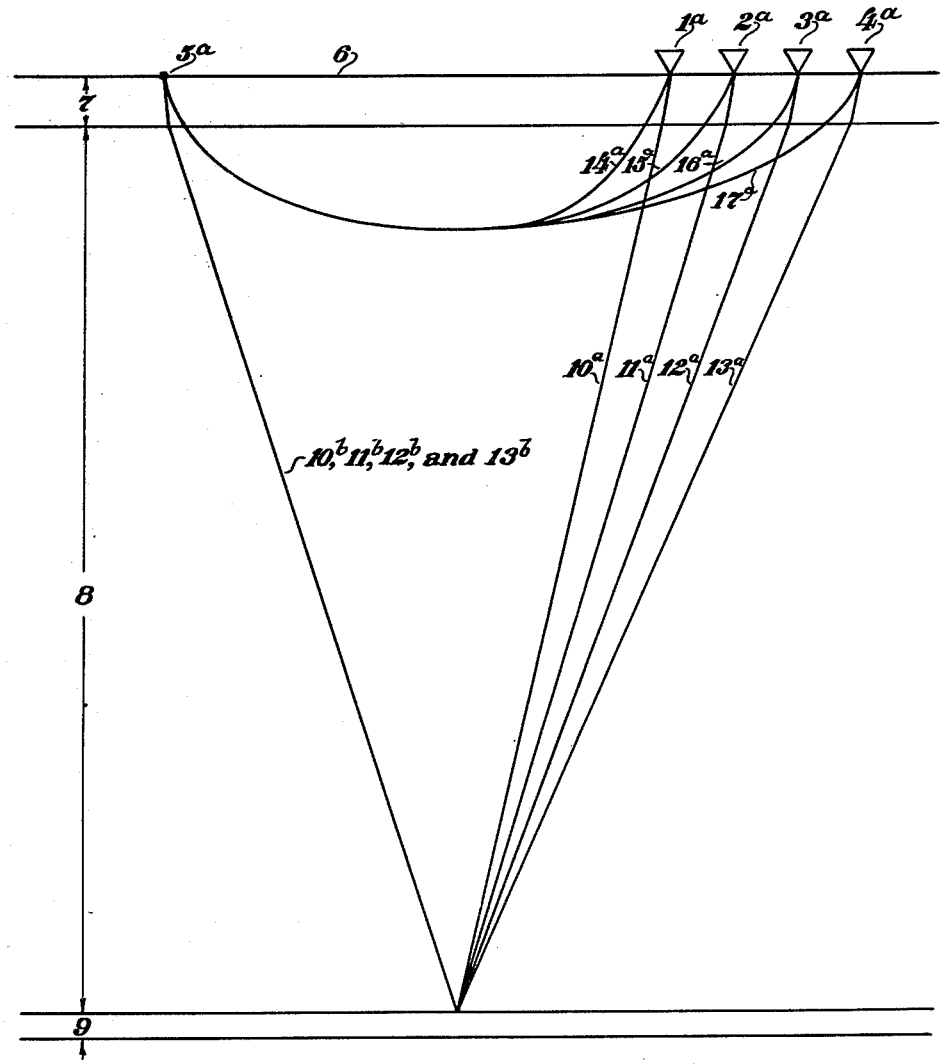
Figure 2 is a diagram of a cross-section of the earth's crust showing the paths followed by the seismic waves radiating from an artificially created seismic disturbance and the location of the seismometers which produce electrical variations for recording (as in Figure 1).

Referring more closely to the drawings, the character A indicates a section of a photographic strip in which 1, 2, 3, and 4, in Figure 1, are the galvanometer traces of the electrical seismographs which are shown as 1ª, 2ª, 3ª, and 4ª, respectively in Figure 2. The lines 5 in Figure 1 are timing traces placed on the strip by means incorporated in the recording instrument and are used to measure the time interval between seismic impulses. The numerals 10, 11, 12, and 13, in Figure 1, are the reflected seismic impulses which are shown in Figure 2, as 10ª, 11ª, 12ª, and 13ª, respectively, and which it is the purpose of this invention to clarify. The numerals 14, 15, 16, and 17, in Figure 1, are the refracted seismic impulses shown in Figure 2 as 14ª, 15ª, 16ª, and 17ª respectively.

Figure 2 is a diagrammatic representation of a cross-section of the earth's crust in which are shown four electrical seismograph units (1ª, 2ª, 3ª and 4ª) which receive the reflected seismic impulses 10ª, 11ª, 12ª, and 13ª, and the refracted seismic impulses 14ª, 15ª, 16ª, and 17ª, as the most important components of a complex seismic wave train from the artificial seismic disturbance 5ª. The numeral 6 represents the earth's surface, while 7 is a thin layer of extremely low speed surface or weathered material. The numeral 8 represents the normal homogeneous sediments of the substratum which have a normal velocity, while 9 represents a hard subsurface strata of very high velocity from which the seismic waves 10ᵇ, 11ᵇ, 12ᵇ, and 13ᵇ, are reflected back to the surface and reach the seismometers 1ª, 2ª, 3ª, and 4ª, practically simultaneously.

From a study of the diagrams 1 and 2 the salient facts are that the refracted waves have different lengths to their paths of travel and as a result arrive at the several seismometers at different times while the paths of the reflected waves are practically equal in length and as a result the reflected waves arrive at the several seismometers practically simultaneously.

By reference to Figures 1 and 2 it becomes obvious that the employment of a multiple string galvanometer with its movable elements linked together by means of a non-conductor for recording the seismic impulses and which will permit the several strings to act in unison with their normal characteristics and amplitudes unimpaired but in the case of a single element acting alone as is true with the reception of impulses at different times the recorded amplitude will be diminished in proportion to the number of seismometers employed and will result in the recording of the reflected impulses in their true form and without diminution of their amplitude while the refracted waves and disturbances will be diminished in proportion to the number of seismometers employed thus clarifying the reflected impulses relative to all other disturbances and permitting their identification with ease.

Figures 3, 4:
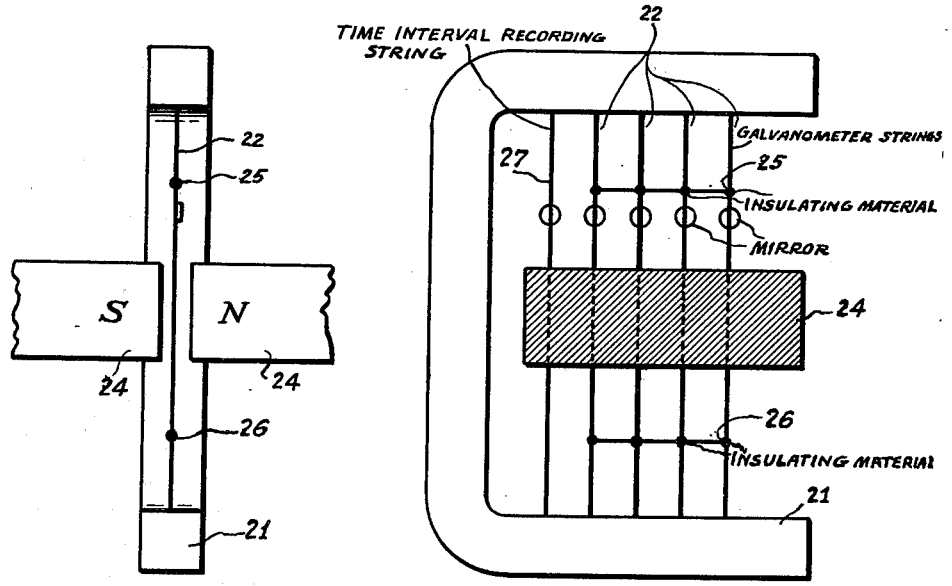
Figure 3 is an edge view of a recording galvanometer with multiple elements, showing the magnets partly broken away, and embodying a structure adaptable to the invention.
Figure 4 is a side view, elevational, of the galvanometer as indicated in Figure 3, showing the magnet in section and illustrating a means for mechanically linking the individual elements (with a non-conductor) together to form a structure adaptable to the invention.

Figure 3 indicates the frame (21) of a multiple string galvanometer with individual strings (22) which are separately actuated by the outputs of the seismometers 1ª, 2ª, 3ª, and 4ª of Figure 2. The pole pieces of the permanent magnet of the galvanometer are shown at 24. The non-conducting wires 25 and 26 link the individual elements together so that they operate normally in unison but oppose each other when not in unison.

Figure 4 is a side elevational view of the galvanometer in which 22 represents the linked strings which are operated by the outputs of the seismometers 1ª, 2ª, 3ª and 4ª of Figure 2. 24 is the permanent magnet employed in the galvanometer. 25 and 26 are the non-conducting wires used to link the galvanometer strings. 27 is the string employed to record the time of the creation of the artificial seismic disturbance. The string 27 of my device records the seismic disturbances in a manner similar to the stylus 16 of the sound apparatus disclosed in Letters Patent No. 1,427,181, August 29, 1922.

In Figures 3 and 4 the non-conductors 25 and 26 link the individual strings 22 of the galvanometer so that the rays 10ª, 11ª, 12ª, and 13ª, of Figure 2 and all other individual components of the seismic wave train which arrive at the several instruments 1ª, 2ª, 3ª and 4ª, of Figure 2 simultaneously are recorded in their individual character and with full amplitude, while all of those components which arrive at the several instruments at separate times are diminished in amplitude either by reversal of phase in two or more strings or by the inertial resistance of those strings not in motion, or both.

The invention may be modified and altered to an extent such as would be within the spirit and meaning of the appended claims.

What is claimed as new is:

1. Means for exploring geological formations in an area having a substratum of different density than the overlying strata, said means comprising an apparatus for recording seismic waves from an artificially created center of disturbance near the surface of the earth and from which seismic waves are propagated in all directions, the apparatus comprising a plurality of seismometers or electrical detectors placed at points remote from the center of disturbance and spaced apart so that substantially horizontal waves are out of phase on arrival at the seismometers or detectors, the seismometers or detectors, severally and individually, electrically connected to a like number of individual elements of a multiple string galvanometer and the several strings mechanically linked so that they will move freely in unison but their action is restricted when not acting in unison, whereby to record simultaneously the impulses received by the several seismometers or detectors and whereby, also, horizontal and/or other substantially "out-of-phase" components of the seismic wave trains received at the several seismometers or detectors are damped or diminished in amplitude in proportion to the inertial resistance of, or reversal of phase in, the several strings and the effects of the substantially "in-phase" waves reflected from the substratum are recorded in substantially their full, true and characteristic forms.

2. In an apparatus of the character described, the combination of a multiple recording seismograph unit comprising a plurality of electrical seismometers or detectors located at varying distances from a point of an artificially created disturbance causing the propagation of seismic waves, the seismometers or detectors, severally and individually, electrically connected to a like number of individual elements of a multiple element galvanometer, and the several elements linked together so that they will move freely in unison but their action will be restricted when not acting in unison whereby to record simultaneously the impulses received by the several seismometers or detectors and whereby, also, the "out-of-phase" electrical impulses generated by the seismometers or detectors associated with the galvanometer are damped in proportion to the inertial resistance of, or reversal of phase in, the several elements of the galvanometer and the "in-phase" electrical impulses generated by the seismometers or detectors associated with the galvanometer will be clarified.

3. The herein described apparatus for clarifying the time measurements of individual components of seismic wave trains received by a multiple recording electrical seismograph unit and propagated in all directions from a common source of artificially created disturbance, said apparatus comprising a plurality of electrical seismometers or detectors located at varying distances from the point of disturbance causing the seismic waves and spaced apart, but located at such positions that the electrical impulses generated in the seismometers or detectors occur simultaneously for the reception of any desired component or components of the several seismic wave trains at the several seismometers or detectors and all other electrical impulses generated in the seismometers or detectors occur at different times, the seismometers or detectors, severally and individually, electrically connected to a like number of individual elements of a multiple element galvanometer, and the several elements mechanically linked together so that they will function freely in unison but their action will be restricted when not acting in unison, and means for recording on a strip, simultaneously, the impulses received by the several seismometers or detectors from the common source of disturbance, whereby the electrical impulses generated by the common source of disturbance in the several seismometers or detectors are recorded with the relative amplitudes of the "out-of-phase" recorded components inversely proportional to the "in-phase" reception of the individual component or components which it is desired to clarify and the "in-phase" recorded components are recorded in their true character and with their relative amplitudes undiminished.

KARMON LORANE McHENRY.